INVENTOR
Roy William Mitchell
BY Hane and Nydick
ATTORNEY

INVENTOR
Roy William Mitchell
BY Hane and Nydick
ATTORNEY 3,496,345

PARALLEL CODED SERIAL DIGIT ADDER WITH ADVANCED CARRY RECOGNITION

Roy William Mitchell, Bracknell, England, assignor to International Computers and Tabulators Limited, London, England, a British company Filed May 27, 1966, Ser. No. 553,345
Claims priority, application Great Britain, June 1, 1965, 23,214/65
Int. Cl. G06f 5/04, 7/385
U.S. Cl. 235—176 5 Claims

ABSTRACT OF THE DISCLOSURE

An adding arrangements is described for summing pairs of serially applied digits, the digits being respectively applied as input signals indicative of concurrently-applied binary code representations. The arrangement includes a group a binary adding elments each capable of adding a single pair of code representations, and the code representations of a single pair of digits to be added are applied to the adding elements successively in time in order of increasing denominational significance, individual carry circuits being provided between adjacent pairs of adding elements in the conventional manner. The necessary re-timing of the concurrently-occurring input binary code representations for application to the adding elements is performed by delay elements introduced into the inputs of the adding elements, and complementary delays are introduced into the outputs from the adding elements so that the sum code component representations from all the adding elements are available concurrently at the output of the overall adding arrangements. The time required for the complete passage of the code representations of a pair of digits through the arrangement is clearly a multiple of the operating time of a single adding element. A separate carry generator is provided which is responsive to the concurrent occurrence of all the code components of a pair of digits to produce a digital carry output only, in a time which is not significantly greater than the operating time of a single adding element, and the output of the carry generator is applied to that adding element dealing with the code components of least significance. Thus, the provision of this carry generator allows the input carry from one to the next digit representation to be determined without the necessity for waiting for completion of a "ripple-through" carry from the succession of code component additions and thus allows the application of successive digit representations at intervals not significantly greater than the operating time of a single adding element. It is thus possible to operate the adding arrangement under conditions in which the addition of code components of least significance of one digit is occurring before the completion of the addition of code components of higher significance of the preceding digit of the series, thereby greatly reducing the overall effectivve operating time required for completing the summing process.

This invention relates to electronic calculating apparatus in which signals representing digits are operated on to produce further signals representing the result of a mathematical operation on the digits.

In known calculating apparatus the signals representing the digits of a word are fed to an arithmetic unit either in series or in parallel. In the serial mode of operation the digits of like denomination from each of two words to be added together are fed simultaneously to an adder starting with the lowest denomination and a digit sum is produced for each pair of digits in sequence. However, adding a pair of digits may give rise to a carry into the next higher denomination and this carry must be taken into account when producing the sum of the digits of next higher denominational significance. Serial arithmetic units require a series network of logical elements and signals representing the sum and carry are generated only when the digit signals have passed through all the elements of the series. Thus if each element has a propagation time $T_P$, a series of $n$ elements will take a time $nT_P$ in which to operate on a pair of digits and produce a sum and a carry. Since the carry information is required in summing the pair of digits of next higher denominational significance, these digits cannot be entered into the added until a time interval equal to $nT_P$ after the preceding digits. Thus although each element of the adder may have a resolution time of $T_R$, the effective resolution time of the adder is $nT_P$, which is greater than $T_R$.

In order to increase the speed of operation it has previously been necessary to utilise a parallel mode of operation in which all the digits of a pair of words are entered into the arithmetic unit simultaneously. This enables the sums of each pair of digits to be produced simultaneously but it is then necessary to propagate carry signals in series from the lowest to highest denomination. Consequently the maximum speed of operation of the adder is limited by the time required in the worst case to propagate a carry from the lowest to highest denomination. Thus although an increase of speed is obtained by utilising a parallel added it is a relatively small increase compared with the large amount of additional apparatus required.

A further form of adder has been utilised for operating on digits represented in binary coded form. Such adders consist of separate channels operating in parallel for each binary code bits and the digits are operated upon successively in series. The speed of operation of such serio-parallel adders is limited by the time required to generate carries between successive digits.

According to the invention electronic calculating apparatus includes an adder consisting of a network of logical elements operative in response to signals representing input digits to produce further signals representing the sum of a pair of input digits after a time interval exceeding the operating time of the individual logical elements, means to apply the digits inpairs of like denomination in successive digit periods; and means operative in response to a pair of input digits occurring in one digit period to generate a carry signal which is applied to the adder during the next succeeding digit period whereby the intervals between successive digits may be reduced to a time substantially equal to the operating time of the individual logical elements.

The invention will be more fully described hereinafter with reference by way of example to the accompanying drawings in which.

Figure 1:
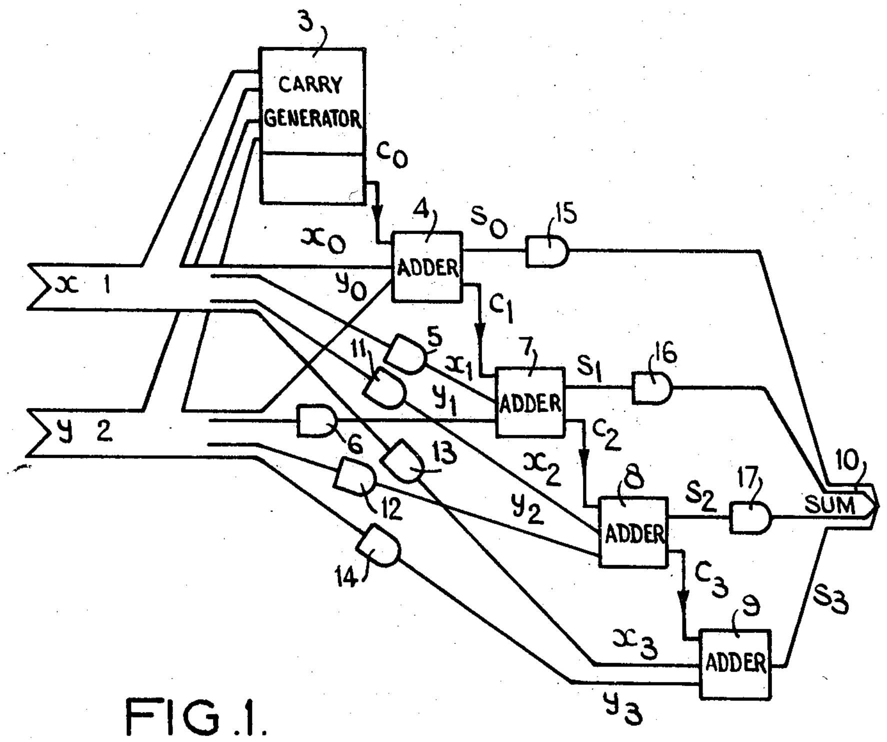
FIGURE 1 shows diagrammatically a four wire serio-parallel adder.

Referring to FIGURE 1, electrical signals representing the digits of two multi-digit numbers to be added together are fed to the input of an adder network along input channels 1 and 2. The digits $x$ of one number are fed serially along channel 1 and the digits $y$ of the other number are fed serially along channel 2, the digits in each channel being fed in ascending denominational significance in successive digit periods. The digits of the two numbers applied to the respective channels 1 and 2 in any one digit period have the same denominational significance. The digits $x$ and $y$ are represented in the form of bits $x_0$, $x_1$, $x_2$, $x_3$, and $y_0$, $y_1$, $y_2$, $y_3$ respectively and each channel is provided with separate wires to carry the electrical signals representing each of the bits of the digits. Thus the digits of the numbers are fed serially and the bits of the digits are fed in parallel. The bits $x_0$ and $y_0$ of lowest significance are fed to a binary adder 4 which produces a sum bit signal $S_0$ and a carry signal $C_1$. The bits $x_1$ and $y_1$ of next higher significance are passed through delay elements 5 and 6 respectively and together with the carry signal $C_1$ are fed to a binary adder 7 which produces a sum bit signal $S_1$ and a carry signal $C_2$. The delay introduced by the elements 5 and 6 is equal to the operating time of the binary adder 4 so that the delayed bits $x_1$ and $y_1$ are applied to the binary adder 7 concurrently with the carry signals $C_1$. The bits $x_2$ and $y_2$ are delayed by delay elements 11, 12 respectively and fed concurrently with the carry signal $C_2$ to a binary adder 8 to produce a sum bit signal $S_2$ and a carry signal $C_3$. The highest significant bits $x_3$ and $y_3$ are delayed by delay elements 13, 14 respectively and fed concurrently with the carry signal $C_3$ to a binary adder 9 to produce a sum bit signal $S_3$.

The sum signal $S_0$ is delayed by delay element 15 by a time internal equal to the aggregate operating times of the binary adders 7, 8 and 9 and then fed along a first wire of a four wire output channel 10. The sum bit signal S, is delayed by a delay element 16 by a time interval equal to the aggregate operating times of the binary adders 8 and 9 and then fed along a second wire of the output channel 10. The sum bit signal $S_2$ is delayed by delay element 17 by a time interval equal to the operating time of binary adder 9 and then fed along a third wire of the output channel 10. The sum bit signal $S_3$ from the binary adder 9 is fed directly to a fourth wire of the output channel 10. If each of the binary adders, 4, 7, 8, 9 has an operating time $t$, the delay elements 5, 6, 17 delay the signals passing therethrough by time $t$, the delay elements 11, 12, 16 delay the signals by time $2t$ and the delay elements 13, 14, 15 delay the signals by time $3t$. It will be seen, therefrom, that the total time interval between the occurrence of 8 signals representing two digits of like denominational significance on the two input channels 1 and 2 respectively and the occurrence of the resulting sum bit signal on the output channel 10 is equal to $4t$ irrespective of which binary adder processes the signals. Thus since the bits of two digits $x$, $y$ being added are applied concurrently in parallel in a single digit period on the input channels, the sum bit signals $S_0$, $S_1$, $S_2$, $S_3$ occur concurrently on the four wires of the output channel 10.

It will be clear from the foregoing description that the bits, or binary code component representations of the input digits X and Y are applied over four channels to the adding elements 4, 7, 8 and 9, each adding element respectively being effective to add together bits from both digits X and Y having the same code component significance; and that the elements 4, 7, 8 and 9 become effective actually to perform this addition in succession, beginning with that element handling the bits of least code denominational significance. In order to produce this succession, which enables the carry output from one adding element to apply a carry input to that element handling the bits of next higher code denominational significance, it is necessary to delay the application of the bit signals to the adding elements 7, 8, and 9 respectively for successively longer time periods. Because these delayed timings then result in the production of code component sum outputs from the adding elements at different times, it is necessary to provide complementary delays in the output paths from the adding elements, so that the sum component representations all become available at the output channel 10 concurrently. Thus, the progress of the signals representing the code component bits from the channels 1 and 2 to the channel 10 is continuous, and the conventional carry ripple through the adding elements is obtained as a result merely of selectively delaying the signals through the adding network. It will also be apparent that the adding element 4 associated with the code component bits of least code denominational significance has completed its addition operation after only a quarter of the time taken (in the present case) for the entire addition operation on all bits. Hence, provided that the carry requirements for input to the addition of the digits X and Y of next higher denominational significance are available immediately after the time $t$ when the adding element 4 has completed its addition, then these next digit representations could be applied to the adding network at this time, and the signals representing the bits of these digits would then progress through the network, always delayed by the same interval behind the signals representing the bits of the immediately preceding digits. The way in which this advanced carry recognition is accomplished will now be described.

The two input channels 1, 2 are also connected to a carry generator circuit 3 which consists of a logical network (shown in FIGURE 2) arranged to generate a carry signal $C_0$ if addition of two digits of one denomination gives rise to a carry to the next higher denomination. The carry generator circuit 3 is arranged to generate the carry signal $C_0$ before all the sum bit signals, resulting from addition of a pair of input digits, have been produced. Therefore, the next pair of digits of the two words being added may be fed along the input channels 1 and 2 before all the sum bit signals of the preceding digits have been generated. Preferably the carry signal $C_0$ is generated and applied to the binary adder 4 as soon as the binary adder 4 has completed operating on the bits $x_0$, $y_0$ of the digits giving rise to the carry $C_0$. Thus the rate of feeding digits to the adder may be such that the time interval between consecutive digit periods is substantially equal to the operating time of the individual binary adders.

The operation of the carry generator circuit 3 will now be described in more detail. A first condition for the occurrence of a carry from one multi-bit digit denomination to the next higher denomination when summing two digits is that the binary bits in at least one denominational bit position of both digits have the value 1 and in every higher denominational bit position the binary bit of one or other of the digits has the value 1. A second condition which may give rise to a carry is that in every denominational bit position, the binary of one or the other digit has the value 1. For the second condition a carry will occur only if there is a carry into this digit denomination from the next lower digit denomination.

Figure 2:
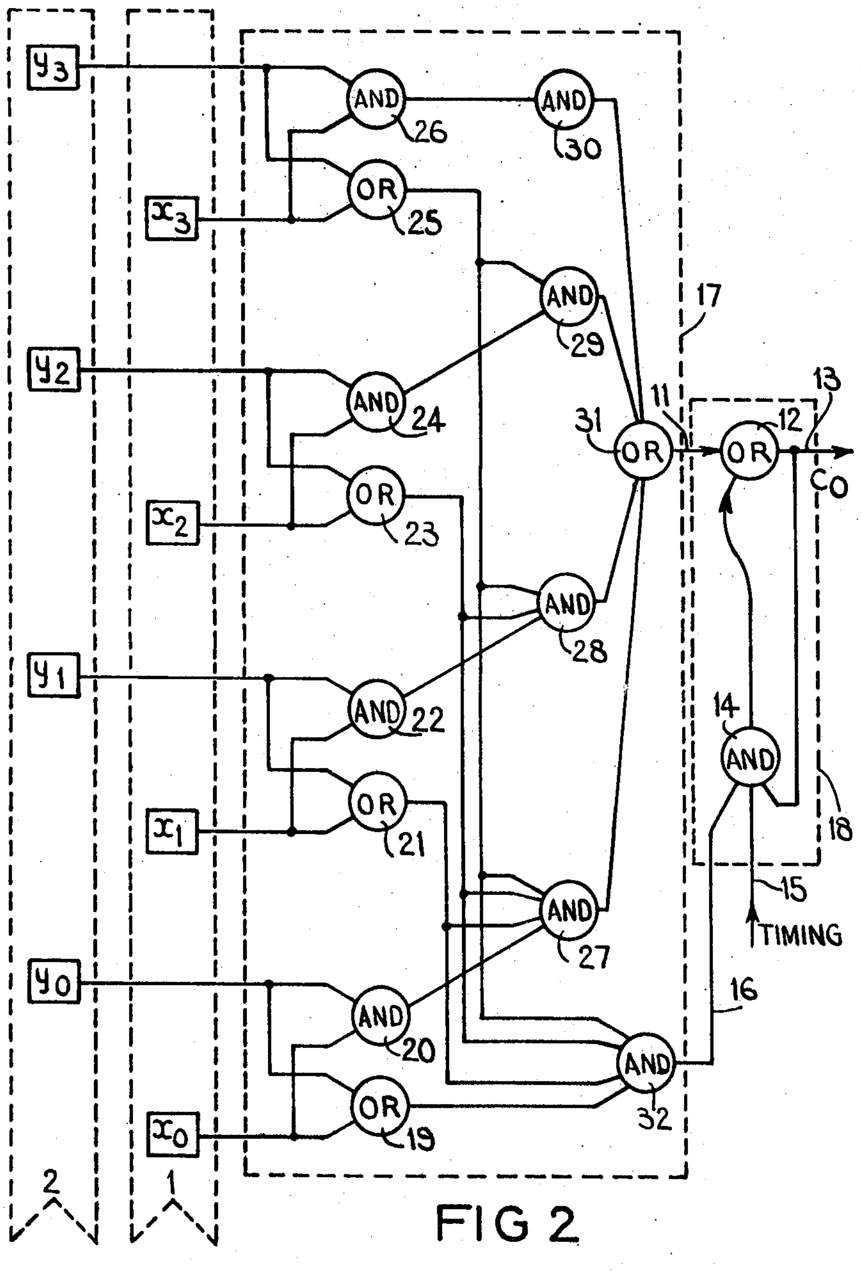
FIGURE 2 shows diagrammatically the logical arrangement of a carry signal generator of the adder.

The logical arrangement of the carry generator circuit 3 preferably consists of a staticiser 18 controlled by a logical network 17 a shown in FIGURE 2. If the input digits $x$ and $y$ produce the first carry condition then the network 17 generates a start carry signal on line 11 which is applied to an OR gate 12 of the staticiser to generate a carry output signal $C_0$ on the line 13. A recirculation loop is provided between line 13 and line 11 by an AND gate 14 which is controlled by the timing signals applied on line 15. If the input digits produce the second carry condition a logical hold signal is generated on line 16 by the network 17 which is applied to the AND gate 14. The logical hold signal opens the gate 14 and, if a carry signal was generated by the digits of next lower denomination, the carry signal is recirculated and retimed to appear on the line 13 in time with the digits of next higher denomination. However, if no carry signal was generated by the digits of next lower denomination, there is no signal to pass through the opened gate 14 and no carry is generated.

The start carry signal and logical hold signal are generated by the network 17 by the following logical operation.

If $x=x_0+x_1+x_2+x_3$ and $y=y_0+y_1+y_2+y_3$ and the logical functions AND (A) and OR(O) of corresponding bits pairs are functions AND (A) and OR(O) of corresponding bits pair are $$A_r=x_r \,\&\, y_r$$

$$O_r=x_r V y_r$$

then logical hold $$H=O_0 \& O_1 \& O_2 \& O_3$$

and starting carry $$S=(A_0 \& O_1 \& O_2 \& O_3)$$
$$V(A_1 \& O_2 \& O_3)$$
$$V(A_2 \& O_3)$$
$$VA_3$$

In the logical network 17 the bits $x_0$, $y_0$ of a pair of digits $x$ and $y$ on input channels 1 and 2 are applied to an OR gate 19 and an AND gate 20. The bits $x_1$ and $y_1$ are applied to an OR gate 21 and an AND gate 22. The bits $x_2$ and $y_2$ are applied to an OR gate 23 and an AND gate 24 and the bits $x_3$ and $y_3$ are applied to an OR gate 25 and an AND gate 26. The outputs of AND gate 20 and OR gates 21, 23, 25 are applied to an AND gate 27. The outputs of AND gate 22 and OR gates 23, 25 are applied to an AND gate 28. The outputs of AND gate 24 and OR gate 25 are applied to an AND gate 29 and the output of AND gate 26 is applied to the single input of AND gate 30. The outputs of AND gates 27, 28, 29, 30 are applied to an OR gate 31 which generates the start carry signal S on line 11.

The outputs of OR gates 19, 21, 23 and 25 are also applied to an AND gate 32 which generates the logical hold signal H on line 16.

It will be clear, therefore, that in operation, for each pair of digits applied over the channels 1 and 2, the presence of a bit having binary code value "one," in both X and Y bits respectively of same code denominational significance cause a signal to pass through the appropriate one of a group of first-stage AND gates (the group in the present case consisting of the AND gates 20, 22, 24 and 26) to one of a group of second-stage AND gates (the gates 27, 28, 29 and 30). The particular AND gate of this second-stage group to which this signal is applied is also conditioned by further signals from those of the OR gates 19, 21, 23 and 25 which are associated with greater denominational significance, the OR gates passing a signal if in response to the presence of a bit of such greater significance having a value 1 in either or both the X and Y digits respectively. Thus, the passage of a signal through any one of the AND gates 27 through 30 indicates that a starting carry condition exists. It is to be noted that the AND gate 30 has only a single input and it will be understood that this gate is provided to maintain standard the signal propagation period through the carry generator network if it results from the presence of X and Y bits of greatest code denominational significance, and that clearly a delay element having the same propagation time could be substituted for the AND gate 30. The output from the AND gates 27 through 30 are then applied through OR gates 21 and 12 to the carry output line $C_0$, and the total time taken to propagate a signal through the network is made equal to the time interval between feeding successive digits to the channels 1 and 2. As noted earlier, this time is made substantially equal to the operating time $t$ of the adding elements for greatest effective adding speed, but must obviously not be shorter than the time $t$. Hence the carry output signal from the carry generating network occurs at the time when that adding element 4 of least denominational significance has applied to it the appropriate X and Y digit bits of the digit following that which gave rise to the output signal.

In the case where the carry output signal is required to be contingent upon the occurence of a carry from the preceding pair of digits (the second carry condition referred to above, also referred to as the logical hold condition) then any carry output signal resulting from the preceding digit is recirculated to AND gate 14, and the gate 14 is opened only if a signal is passed from the AND gate 32 (signifying the condition where at least one of the X or Y bits has a value of one in all code decominations) at the time when the next following digits X and Y occur on the channels 1 and 2 respectively. It will be clear from the foregoing remarks on the timing consideration that the need for separately retiming the operation of the gate 14 by the timing signal over the line 15 may be avoided by providing a delay element in the recirculation path from the line 13 to the AND gate 14 and allowing the signal from this path alone to control the opening of the gate 14.

It will be realised that throughout the foregoing description the delay elements referred to are not required to have a separate storage facility per se. It is enough that they produce a propagation delay in a path to be taken by a signal, so that they, in effect, retime the signal relative to other signals which are not subject to the same or indeed, to any delay. Thus, any storage facility apparently possessed by the delay elements is a function only of the finite signal propagation time inherent in the delay element.

Whilst an embodiment has been described in relation to a four wire adder the invention may be utilised for adder having larger or smaller numbers of wires in a channel. For example, the invention may be utilised in a single wire adder in which the carry generator can be operated to generate a carry signal in a shorter time than the adder takes to generate the sum signal.

What is claimed is:

1. Adding apparatus including an array of adding elements; means for applying to the adding elements in each of a succession of digit periods respectively digit signals representing pairs of input digits of like digital denominational significance to be added together, said digit signals being applied successively in order of increasing digital denomination significance and including for each digit a plurality of concurrently applied code component representing signals of differing code component significance, the signals applied to each individual adding element having like code component significance from both input digits of the pair, each different adding element thereby being associated with code components of a particular code denominational significance, the means for applying the digit signals including first delay means connected to the adding elements for regulating the application of the code component representing signals in successive elementary periods in order of increasing code denominational significance to the respectively associated adding elements; carry signal propagation paths connected respectively each between an adding element and that other adding element associated with code components of next higher denominational significance, the adding elements each being operable in one of said elementary periods to produce an output signal and being jointly responsive to the application of signals to produce output signals representative of code components of the sum of the applied digits; second delay means connected to the adding elements for selectively delaying the output signals from the individual adding elements to render all said output signals effective concurrently; a common digit carry generator; means for applying said digit signals to said carry generator, said carry generator being responsive to the application of said digit signals to produce a digital carry output signal in a predetermined operating period of a duration not significantly greater than said elementary period; and means connected between said carry generator and that adding element associated with the code components of least code denominational significance to apply said carry output signal to that adding element, the operating period of said carry generator corresponding to one of said successive digit periods.

2. Apparatus as claimed in claim 1 in which said digit signals represent in each of said digit periods a pair of digits to be added together expressed in binary code having four binary code denominations; in which said array includes four adding elements, one for each binary code denomination, each adding element being a full binary adder associated with each of said binary code denominations respectively and being responsive to the occurrence of a pair of binary code-representing signals to produce an elementary sum code signal and an elementary carry signal, and in which said first delay means includes a first delay element connected to each of said adders except that associated with the binary code denomination of least significance, the first delay elements being arranged respectively to delay the occurrence of said binary code component signals of successively higher code denominational significance by periods respectively equal to once, twice and three times the duration of said elementary period, the carry propagation paths including means for connecting the elementary carry signals of all but that binary adder associated with the binary code denomination of greatest significance respectively to the binary adder associated with the code denomination of next higher significance to correct the binary code representation of said elementary output signals in respect of carries generated in the successive additions of binary code signals representative of a single pair of digits.

3. Apparatus as claimed in claim 2 in which said second delay means includes for each adder except that associated with the binary code denomination of greatest significance a second complementary delay element connected to the respective adder in the path of said elementary sum code representing signal.

4. Apparatus as claimed in claim 1 in which said digit signals represent in each of said digits a pair of digits to be added together expressed in binary code having four binary code denominations and in which said common digit carry generator includes a first group of AND gates, one for each binary denomination respectively connected to the digit applying means, each AND gate of the first group operable to produce a first signal if the binary code expressions of the like code denominational significance of both digits of the pair represent the binary value one; a second group of OR gates connected to the digit applying means, one for each binary denomination respectively, each OR gate being operable to produce a second signal if at least one of said binary code expressions represents the binary value one; a third group of AND gates connected selectively to said first and second groups operable in response to said first and second signals to produce a third signal if a first signal from one gate of said first group occurs concurrently with second signals from all those gates of said second group associated with binary denominations of higher significance respectively; carry output deriving means connected to said third group of said gates operable in response to said third signal to produce said digital carry output signal; an independent AND gate connected to said second group operable if all the gates of said second group produce said second signals concurrently to produce a fourth signal; and means connected to said carry output deriving means and to said independent AND gate for delaying said digital carry output signal by one digit period and operable to produce a fifth signal if said fourth signal and the delayed digital carry output signal occur concurrently, said carry output deriving means also being connected to said delaying means and also being responsive to said fifth signal to produce the digital output signal in the current one of said digit periods.

5. Apparatus as claimed in claim 4 in which said means for delaying said digital carry output includes a second independent AND gate connected to said carry output deriving means and to said independent AND gate and means for applying a retiming signal to said second independent AND gate.

References Cited

UNITED STATES PATENTS

| | | | |
|---|---|---|---|
| 3,249,746 | 5/1966 | Helbig et al. | 235—175 |
| 3,378,677 | 4/1968 | Waldecker et al. | 235—175 X |
| 2,805,020 | 9/1957 | Lanning | 235—176 X |
| 3,202,806 | 8/1965 | Menne | 235—175 |

EUGENE G. BOTZ, Primary Examiner

DAVID H. MALZAHN, Assistant Examiner

U.S. Cl. X.R.

235—174